United States Patent [19]

Kane et al.

[11] Patent Number: 4,847,770
[45] Date of Patent: Jul. 11, 1989

[54] INITIAL TERMINAL TESTER

[75] Inventors: Mark K. Kane; Gregory C. Martin, both of Montgomery County, Md.

[73] Assignee: Pulse Electronics, Inc., Rockville, Md.

[21] Appl. No.: 121,037

[22] Filed: Nov. 16, 1987

[51] Int. Cl.⁴ .................. B60T 17/22; G01M 3/02
[52] U.S. Cl. .................. 364/426.05; 73/129; 73/39; 303/20; 364/552; 246/169 R
[58] Field of Search .............. 364/426, 552, 426.05; 303/1, 15, 20, 84.1; 340/52 R, 52 A, 52 C, 52 B; 73/121.39, 129, 40; 246/169 R

[56] References Cited

U.S. PATENT DOCUMENTS

| | | | |
|---|---|---|---|
| 2,637,201 | 5/1953 | Meier | 73/39 |
| 2,993,199 | 7/1961 | Browne et al. | 340/52 R X |
| 3,784,813 | 1/1974 | Ryan | 340/52 R X |
| 4,041,470 | 8/1977 | Slane et al. | 307/9 X |
| 4,066,299 | 1/1978 | Clements | 303/20 |
| 4,344,138 | 8/1982 | Frasier | 364/426 |
| 4,487,060 | 12/1984 | Pomeroy | 73/129 |
| 4,553,723 | 11/1985 | Nichols et al. | 364/426 X |
| 4,567,757 | 2/1986 | Melocik et al. | 73/129 |
| 4,687,258 | 8/1987 | Astley | 303/20 X |
| 4,755,803 | 7/1988 | Shockley et al. | 73/121 X |

Primary Examiner—Eugene R. LaRoche
Assistant Examiner—Seung Ham
Attorney, Agent, or Firm—C. Lamont Whitham; Michael E. Whitham

[57] ABSTRACT

An automated initial terminal testing system tests the air pressure and leakage of the brake pipes and the operation of brakes of railroad trains (10) in a terminal yard before trains are allowed to go on a railroad. The system includes end of train devices (16) attached to the trailing coupler of the last car of each train, head of train devices (14) connected to a source of yard air (26) and the air hose connection to the brake pipe of the first car of each train, and a central control console (18). The end of train devices, normally used to transit brake pipe pressure data to the engineer in locomotive when a train is on a railroad, monitors the air pressure in the brake pipe during the charging operation and transmits this data to the central control console. The head of train devices control the charging and venting of air pressure at the front of the train. These devices monitor air pressure and transmits this data to the central control console. In addition, the head of train devices respond to commands transmitted from the central console to perform the charging and venting operations. The central control console monitors the data sent by all end of train and head of train devices in the yard, sends commands to the head of the train devices, and provides either a pass of fail output for the trains under test.

19 Claims, 13 Drawing Sheets

BELOW VALID ONLY WHEN CURSOR
IS AT THE TRAIN UNDER TEST

| TS | ALLOWED | | NO ACTION | |
|---|---|---|---|---|
| 1 | ADD | F1 | CHRG | F3 |
| | INTERR | F6 | RLS | F4 |
| | ABORT | F2 | LAP | F5 |
| | SCRN | F8 | MISC. | F10 |
| | | | DEL | F9 |
| 2 | UPDT | F11(MSG2) | CHRG | F3 |
| | INTERR | F6 | RLS | F4 |
| | ABORT | F2 | LAP | F5 |
| | SCRN | F8 | MISC. | F10 |
| | ADD | F1 | | |
| 3 | UPDT | F11(MSG4) | CHRG | F3 |
| | INTERR | F6 | RLS | F4 |
| | ABORT | F2 | LAP | F5 |
| | SCRN | F8 | MISC. | F10 |
| | ADD | F1 | | |

• USER INPUTS; PASSWORDS REQUIRED

CHANGE IN THE TRAIN FIELD
NOT ALLOWED @ TS = 1,2,3

MSG 1: BOTTOM SCRN

TRAIN X IS READY FOR
BRAKE INSPECTION

MSG 2: TOP SCRN

HAS TRAIN X PASSED
BRAKE APPLICATION
Y-PASSED NO-FAIL QUIT

Y•    N•    Q•

MSG 3: BOTTOM SCRN

RELEASE CHECK FOR TRAIN X
IS READY TO BE DONE

MSG 4: TOP SCRN

ALL BRAKES HAVE BEEN
RELEASED PROPERLY
  YES   NO   QUIT

Y•    N•    Q•

MSG 5: BOTTOM SCRN

TRAIN X HAS PASSED THE TEST

MSG 2a

CONTINUE TEST BY
RELEASING BRAKES
Y-RELEASE  N-WAIT

INITIAL TERMINAL TESTER

BACKGROUND OF THE INVENTION

1. Field of the Invention

The present invention generally relates to an automated tester for charging the air brake pipe of a train consist to a predetermined pressure and checking pressure at a central location and, more particularly, to an Initial Terminal Tester (ITT) comprising a Head-Of-Train (HOT) unit which controls the charging and venting of air pressure at the front end of a train, an End-Of-Train (EOT) device which monitors and transmits air pressure data, and a Central Control Console (CCC) which monitors both the HOT and EOT devices on each track of a train yard.

2. Description of the Prior Art

Before a train may leave a terminal, it must pass an initial terminal air brake test. The charging and testing is often done in the train yard using a yard air supply, several pressure gauges, and a watch.

A train is made up of many individual cars, termed a consist, that are placed on the same track by a yard crew for eventual coupling to one or more locomotives. As soon as the consist is completed, the yardmaster turns the track over to the car department for hookup and testing. The car department dispatches a car inspector to that track with the following duties: (1) inspect all cars in the consist for defects, and (2) hookup and test, using a yard air plant, the air brake system.

The car inspector generally goes to the head of the track, i.e., that end which will be nearest to the hauling locomotive, hooks up the yard air to the first car, inspects the first car and then couples the air hoses between the first and second cars, turns the air "in" and repeats the procedure for each car in the consist. That is, he next couples the air hoses between the second and third cars, goes back to the coupling between the first and second cars and turns the air "in". Then, he couples the air hoses between the third and fourth cars, goes back to the coupling between the second and third cars and turns the air "in", and so forth. This is known as "carrying the air with him". By utilyzing this procedure, when the car inspector finishes inspecting and hooking up the air, the air pipe of the consist is generally fairly well charged. Charging must continue, however, until a pressure of 65 psi is attained at the opposite end of the consist, and so the inspector waits at the end of the train until that pressure is attained. A 15 psi service reduction is then made. After waiting 60 seconds for the brake pipe pressure to settle, the leakage is observed for another 60 seconds. If the leakage exceeds 5 psi in that period, the consist fails the test. If the pressure has not reduced to 57 psi, it is reduced to that amount.

In order to make a brake test, the car inspector then needs to walk back to the front end of the consist, turn off the yard air, make a 20 psi reduction in the air pipe, and "walk the brakes". The 20 psi reduction in air pressure should cause the brakes of all cars in the consist to be applied. By "walking the brakes", what is meant is that the car inspector walks the length of the consist checking the brakes on each car to see that they have been applied. Once he has verified that all the brakes have been applied, he must then walk to the front of the consist, reapply yard air, build the pressure back up and "walk the release", i.e., check brakes on each car to see that they have released. Alternatively, the inspector may make a "roll-by release inspection" depending on current Federal regulations and company rules.

This procedure requires the car inspector to make five trips between the head and rear of the train consist to completely inspect the consist or, where a "roll-by release inspection" is made, four trips between the head and rear of the consist must be made. Where there are sufficient personnel, two car inspectors will work together, one coupling hoses and the other turning the air "in" and so on, but the foregoing procedure is still followed.

As an additional responsibility, the car inspector has been given the duty of applying the End-Of-Train devices to the trailing coupler of the last car of the consist. End-Of-Train or EOT devices are designed to be mounted on the trailing coupler of the last car of a train and are connected to the brake air pipe for monitoring, among other things, the brake pipe pressure. On a more or less periodic basis, data pertaining to the air pressure in the brake pipe is transmitted to a receiver in the locomotive where it is decoded and displayed for the engineer.

Because of the considerable labor involved, it is desirable to automate the initial terminal air brake test. There are a number of prior patents which relate in one way or another to air brake testing, but none suggests a procedure or apparatus for automating the initial terminal air brake test. For example, U.S. Pat. No. 2,637,201 to Meier discloses an apparatus for testing train brakes prior to coupling to a locomotive in which one man operates the testing device to apply the brakes through the train, then walks to the other end of the train to check the brake application. He then takes steps to cause the testing device to release the brakes and walks back along the train to check the brake release on individual cars.

U.S. Pat. No. 2,993,199 to Browne et al. describes automatic inspection apparatus for checking brake mechanisms either from a locomotive or a control at a yard charging station which uses electric pulse producing means responsive to the functioning of the brake mechanisms, and means located on the locomotive or at the yard charging station. The various units, i.e., those on the locomotive or at the yard station or the cars and caboose, are interconnected in a circuit.

U.S. Pat. No. 3,784,813 to Ryan shows an apparatus for testing the complete integrity of a train brake system which utilizes a pressure switch in the brake line of the last car that allows coupling between a transmitting and a receiving coil on opposite sides of the car to indicate operation of the system.

U.S. Pat. No. 4,041,470 to Slane et al. shows a monitoring and reporting system to monitor brake, door, motor and other functions at each car. Sensor, display and processor units are included in each car, and means are provided in the lead car to interrogate other cars which respond with fault information. A data link interconnects the cars.

U.S. Pat. No. 4,056,286 to Burkett discloses a remote control brake system for a train which comprises transceivers at the locomotive and caboose, and includes means for initializing when charging begins to assure that brake pipe pressure at the caboose corresponds to locomotive brake pipe pressure.

U.S. Pat. No. 4,066,299 to Clements discloses apparatus for locating a malfunctioning brake control valve on a train in which the brake pipe at the head end and rear end of a train are equipped with pressure activated devices which can transmit a radio frequency (RF) signal to a receiver located with an engineer or at the rear end. Determining elapsed time after a transmission enables location of a faulty brake control valve.

U.S. Pat. No. 4,361,825 to Shockley shows an automatic train air brake monitoring system which continuously provides signals of elapsed time when air brakes are applied or released, as well as an indication of the quantity of the braking effort.

U.S. Pat. No. 4,487,060 to Pomeroy discloses a brake monitoring system which includes End-Of-Train transmitting equipment.

SUMMARY OF THE INVENTION

It is therefore an object of the invention to provide an automated initial terminal air brake test for railroad trains which will result in considerable labor savings.

It is a further object of the invention to provide a centralized control for the simultaneous initial terminal air brake test of a plurality of train consists in a train yard.

It is another object of the invention to provide automated initial terminal air brake testing apparatus which utilizes End-Of-Train devices which are attached to trains for monitoring air brake pipe pressures on the road.

The foregoing and other objects of the invention are accomplished by an Initial Terminal Tester consisting of three parts: (1) a Head-Of-Train (HOT) device which controls the charging and venting at the front of the train, (2) an End-Of-Train (EOT) device, and (3) a Central Control Console (CCC) which monitors both the HOT and EOT devices on each track in the yard and remotely controls the HOT devices. Like the EOT devices, the HOT devices report pressure to the CCC. With the exceptions of walking the brakes and walking the release, the entire test can be performed from the CCC. The total number of trips required by the car inspector to completely set up and check the train can be cut to just three; hook up, walk the set up, and walk the release. This is a reduction in labor costs by 40%. In some cases, when there are sufficient personnel on duty, a departing train can be given a "roll-by" inspection which precludes the necessity to "walk the release". This means that under the prior manual system, he would walk the train four times, and under the automated system according to the invention, only twice, for a 50% labor savings.

The CCC is capable of monitoring a number of different tracks in the yard by receiving transmissions from the HOT and EOT devices on each track. The CCC initiates a 20 psi brake reduction for test purposes and also releases the brakes. In addition, after testing, the CCC continuously monitors the air status of the trains in the yard by monitoring the EOTs until their respective departures.

The HOT device is a battery powered unit which is located between the air compressor and the first car in the consist. It incorporates a pressure transducer and is capable of performing a reduction to a given pressure. This is made possible by a d.c. motor driven valve of unique design. The HOT device includes a transceiver which transmits data to the CCC and receives control commands from the CCC.

BRIEF DESCRIPTION OF THE DRAWINGS

The foregoing and other objects, aspects and advantages of the invention will be better understood from the following detailed description of a preferred embodiment with reference to the drawings, in which:

FIG. 11B is a table correlated with the flow diagram of FIG. 11 showing valid actions and messages.

DETAILED DESCRIPTION OF A PREFERRED EMBODIMENT OF THE INVENTION

Figure 1:
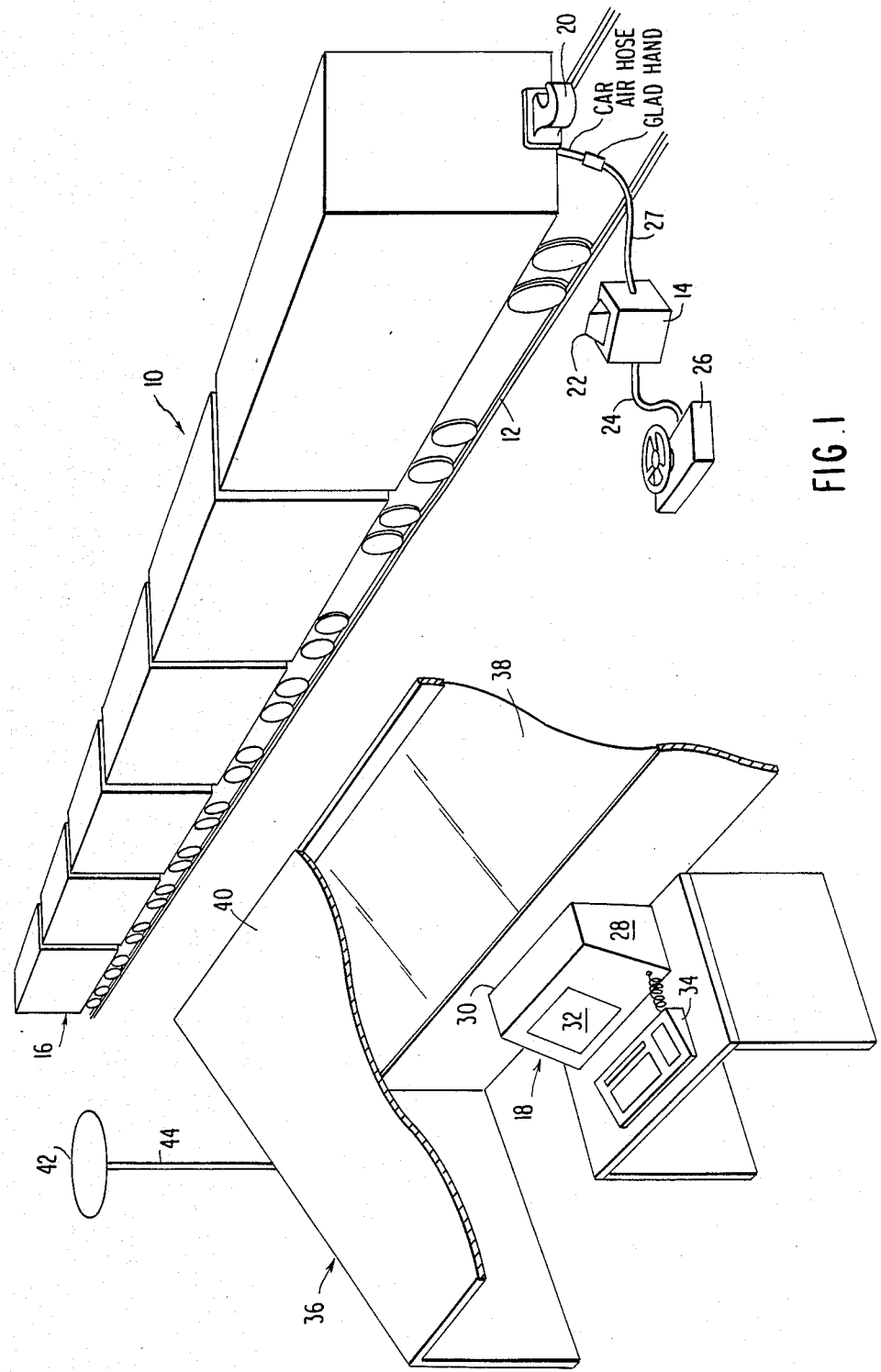
FIG. 1 is a pictorial representation of the Initial Terminal Tester installed in a train yard controlling the air brake test for one track of cars.

Referring not to the drawings, and more particularly to FIG. 1, there is shown a train consist 10 on a yard track 12. For purposes of simplicity of illustration and description, only one consist of a few cars is shown on one yard track; however, it will be understood that the train yard comprises many tracks on which a plurality of train consists are assembled and tested. Moreover, the consists for a freight train, for example, may be as much as a mile long.

The Initial Terminal Tester (ITT) consists of a Head-Of-Train (HOT) device 14, an End-Of-Train (EOT) device 16, and a Central Control Console (CCC) 18. The HOT device is a portable, battery powered device which is attached to the leading coupler 20 of the first car in the consist 10. As will be described in more detail hereinafter, the HOT device comprises a pressure transducer for measuring air pressure, a transceiver for transmitting data to the CCC 18 and for receiving commands from the CCC 18, and a d.c. motor driven valve for venting the train air brake pipe to a given pressure at a service reduction rate, charging the brake pipe from yard air, or isolating the brake pipe from yard air and atmosphere, referred to herein as the "LAP" position. As shown in FIG. 1, the HOT 14 has a radio antenna 22 mounted on the top of the device and is connectable via an air hose 24 to a yard air supply 26 and via an air hose 27 to the glad hand of the first car air hose. When transmitting to the CCC 18, the HOT device 14 identifies itself by a unique ID number. In this way, the CCC 18 is able to distinguish and control a plurality of HOT devices on different tracks of the yard.

At the other end of the train consist 10 is the EOT 16. This is attached to the trailing coupler of the last car of the consist and comprises a pressure transducer for monitoring air pressure and a transmitter for transmitting data relating to the monitored pressure. Ordinarily, this data is transmitted on a more or less periodic basis to a receiver located in the the hauling locomotive. In the practice of the present invention, the EOT device 16 transmits to the the CCC 18. The EOT device 16 may be a conventional device such as the Pulse Electronics, Inc., EOT device which is currently in service on many railroad lines.

The CCC 18 comprises a general purpose computer 28, such as an IBM Personal Computer or a similar computer manufactured by any of a number of manufacturers such as Compaq Computer. Typically, the computer 28 is housed in an industrial type housing 30 and has a display 32 and keyboard 34. The CCC 18 is located in a yard house 36, only partially shown in FIG. 1. The yard house 36 might be provided with a window 38 through which the yard master would be able to visually observe the operations in the train yard. Attached to the roof 40 of the yard house 36 is a radio antenna 42 on a mast 44 for receiving transmissions from the HOT and EOT devices 14 and 16 and for transmitting to the HOT device 14.

Commands are keyed in on the keyboard 34 by track number. The commands include report, test, charge to yard air, vent to a defined pressure, and vent to atmosphere. The CCC 18 software allows the HOT and EOT device ID numbers to be entered or deleted from each track. The CCC 18 continuously monitors the frequency of the EOT device 16 to receive pressure and status reports. Similar data is received from the HOT device 14 in the event of a status change. Periodically, the CCC 18 interrogates the HOT devices to verify continuity.

The CCC 18 also includes a radio frequency communications module (not shown). As will be described in more detail hereinafter, this module is a microprocessor controled device which includes a transmitter and a receiver. The microprocessor handles the real-time aspects of the radio frequency communications between the CCC 18 and the HOT and EOT devices 14 and 16.

The software for the computer 28 provides both audible and visual warnings for special conditions. The warning conditions include loss of radio continuity, completion of test, uninitiated reduction in air pressure, and low battery indications from the HOT and EOT devices 14 and 16. In addition, the software controls the test sequence generally as follows. The procedure begins when a test command is entered on keyboard 34. In response to the test command, the HOT device 14 initiaates a 15 psi reduction. If the 15 psi reduction is overshot, an error message is displayed on display 32 and the test is discontinued until the brake pipe is charged again. After the 15 psi reduction is made, the CCC 18 waits for 60 seconds to allow the air pressure to settle. The air pressure is then monitored for 60 seconds more to measure any leakage. The actual leakage is displayed on the display 32 with a "passed" message if the leakage is less than or equal to 5 psi and a "failed" message otherwise. The console software does not initiate a reduction or a release unless directed to do so by the operator and, for security reasons, a password is required to exercise these options. If the leakage test is passed, the software prompts the operator to reduce the air pressure to 57 psi if the pressure is greater than 57 psi. The operator may then release the brakes when ready.

Subsequent to the initial terminal test, the CCC 18 will alert the operator that two hours have passed since the HOT device 14 for a particular train consist 10 was removed. In addition, an airslip is printed when a consist on a particular track has passed the test. Further, the CCC 18 automatically logs the tests performed to disk from which a printout may later be made. The printout is a report over a predetermined period of time which tabulates the trains tested, the trains that passed the test, and the trains that failed and what the failure condition was.

Figure 2A:
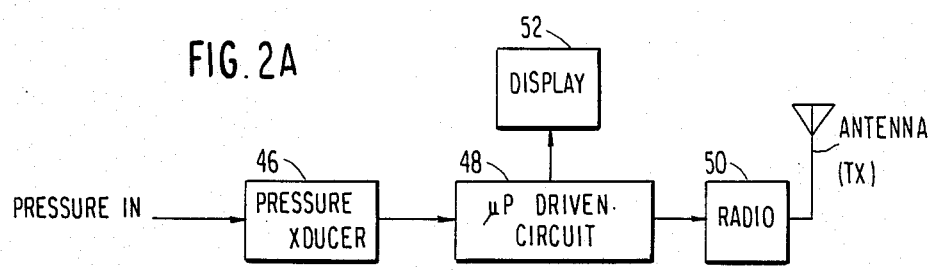
FIGS. 2A, 2B and 2C are generalized block diagrams of the three components of the Initial Terminal Tester.

FIG. 2A shows in general block diagram form a typical End of Train (EOT) unit. This is a commercially available device which is currently in service. In its basic form, the EOT unit comprises a pressure transducer 46 which is attached to the brake pipe of the last car in the consist. The pressure transducer 46 converts a sensed pressure to an electrical analog signal which is, in turn, converted to a digital signal. The digital signal is periodically sampled and latched by a microprocessor driven circuit 48 which operates under the control of a stored program. Periodically, the circuit 48 formats a digital message for transmission by radio transmitter 50. This formatted message includes the ID of the EOT and a digitally encoded pressure value corresponding to the pressure sensed by the transducer 46. In addition, a readout of the pressure is provide by the display 52 so that railroad personnel at the end of the train may monitor the pressure of the brake pipe.

Figure 2B:
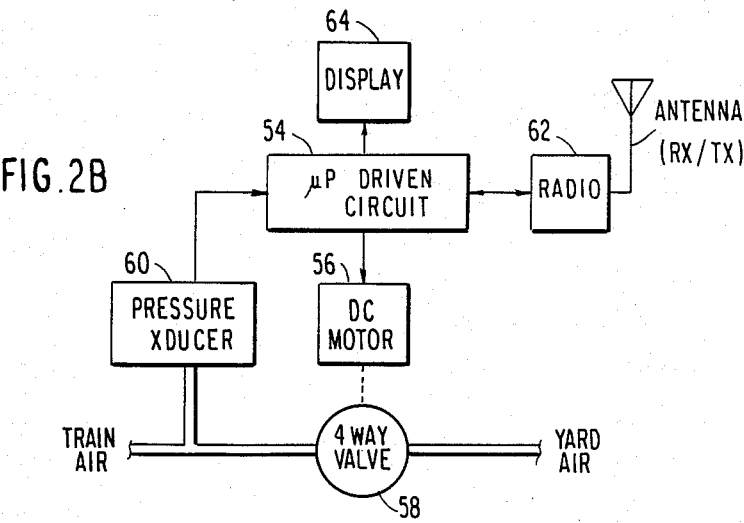

The Head of Train (HOT) unit is shown in FIG. 2B. The heart of this unit is also a microprocessor driven circuit 54 operating under stored program control. The primary control function provided by the circuit 54 is to energize a d.c. motor 56 which drives a four-way air valve 58. The valve 58 is connected between the yard air supply and the brake pipe of the leading car of the consist and is opened, closed or vented by the operation of the motor 56 in the process of charging and checking the brake pipe. A pressure transducer 60 is connected to the brake pipe of the leading car to monitor the instantaneous air pressure in the pipe. A digital signal generated by the transducer 60 representative of the instantaneous pressure is sampled by the circuit 54. Periodically, the circuit 54 formats a message for transmission by the radio transceiver 62. This message includes the ID of the HOT and an encoded digital pressure value corresponding to the sensed brake pipe pressure. The transceiver 62 can also receive digital command signals from the Central Control Console (CCC). These command signals are used to control the energization of motor 56 via circuit 54. In addition, a display 64 is provided so that railroad personnel at the head of the consist can monitor the air pressure and status of the HOT unit.

Figure 2C:
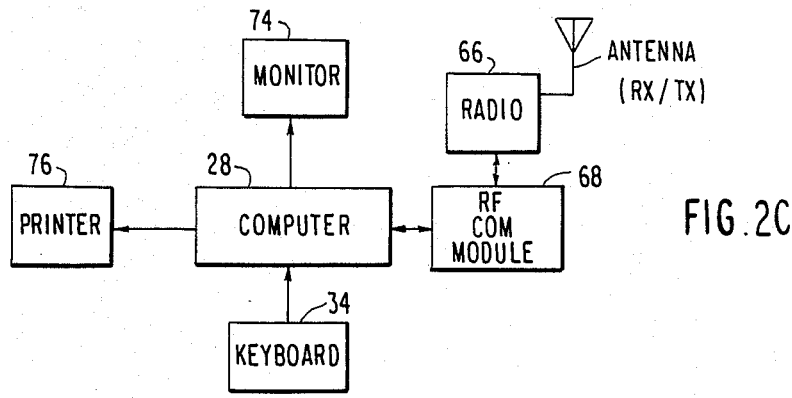

The CCC is shown in FIG. 2C and communicates with the EOT unit and the HOT unit via a radio transceiver 66. Specifically, transceiver 66 receives transmissions from both the EOT and HOT units and transmits to the HOT unit. A radio frequency communication module 68 provides an interface between the transceiver 66 and a computer 28. Operator input to the computer 28 is by means of a keyboard 34, but it will be understood by those skilled in the art that operator input could also be provided by means of a cursor pointing device such as a mouse with the appropriate software user interface. The primary output to the operator is a monitor 74 which provides a display of status and operator prompts. A print out of the airslip on successful completion of the test is made by a printer 76.

Figure 3:
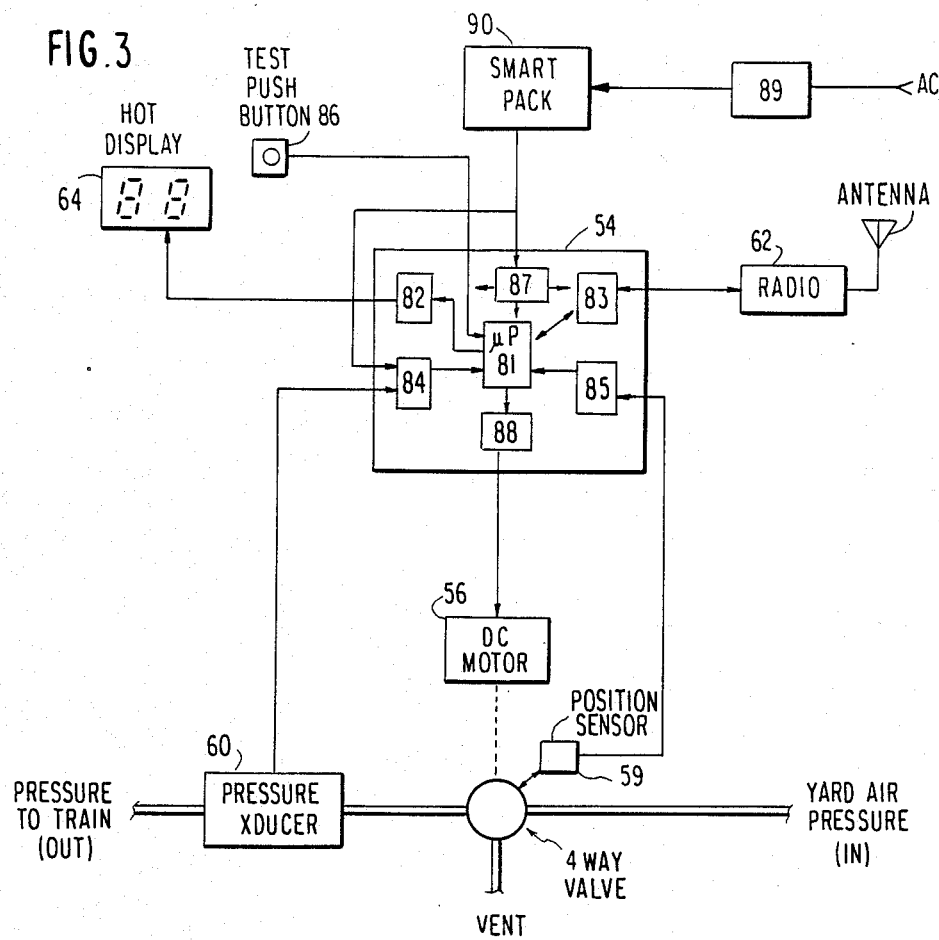
FIG. 3 is a detailed block diagram of the Head-Of-Train device.

Turning now to FIG. 3, the HOT unit is shown in more detail wherein like reference numerals as used in FIG. 2B denote identical components. The circuit 54 includes a microprocessor 81 having read only memory (ROM) and random access memory (RAM). The control program for the microprocessor 81 is stored in ROM while the RAM is used as temporary storage. The microporcessor 81 provides an output via a display driver circuit 82 to the display 64, which is illustrated as being a two digit, seven segment display, preferrably of light emitting diodes (LEDs). The interface between the microprocessor 81 and the radio transceiver 62 is provided by a commercially available modem (modulation/demodulation) integrated circuit (IC) 83. A commercially available analog-to-digital (A/D) converter 84 is connected to receive the analog pressure signal from the pressure transducer 60 and convert that signal to a digital signal which can be sampled by the microprocessor 81. This provides a pressure feedback signal to the microprocessor. Additional feedback to the microprocessor is provided by a position detection circuit 85 which is connected to a position detector 59 attached to the shaft or other rotatable part of the four way valve 58. The energization control for the d.c. motor 56 is provided by motor driver circuitry 88 which provides the interface to the microprocessor 81. A test push button 86 external to the circuit 54 provides an input to the microprocessor 81 which initiates a self-diagnostics test the results of which are indicated on the display 64. Power to the various components which make up the circuit 54 is supplied by an internal power supply 87 connected to a rechargeable battery 90 which is, in turn, connected to an external power supply 89.

Figure 4:
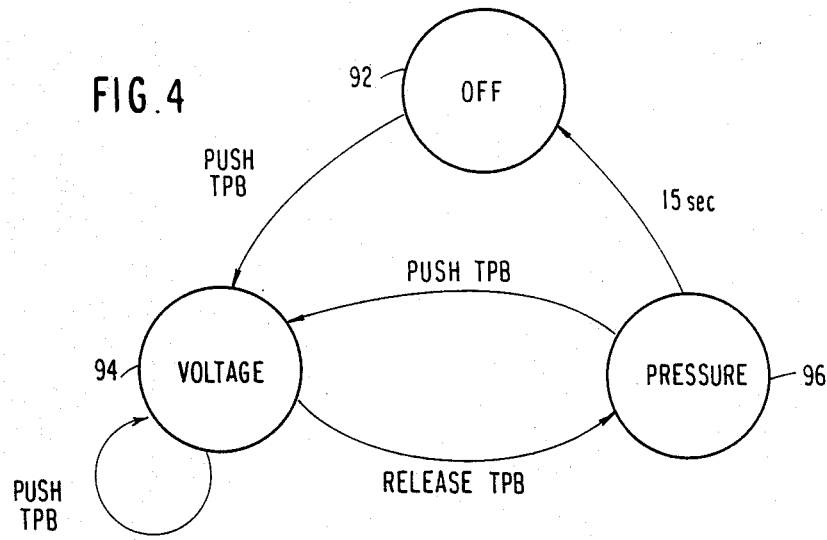
FIG. 4 is a state diagram of the Head-Of-Train display.

FIG. 4 shows the state diagram of the HOT display 64 in response to pressing the test push button 86. Assume the display is initially off at state 92. When the test push button is initially pressed and held, the voltage of the power supply 90 is first displayed at state 94 and, then when the push button is released, the prssure is displayed at state 96. If while the display is in state 96 the push button is pressed again, the display reverts to state 94 to display the voltage. On the other hand, if the push button is not pressed for 15 seconds after entering state 96, then the display reverts to the off state 92.

Figure 5A:
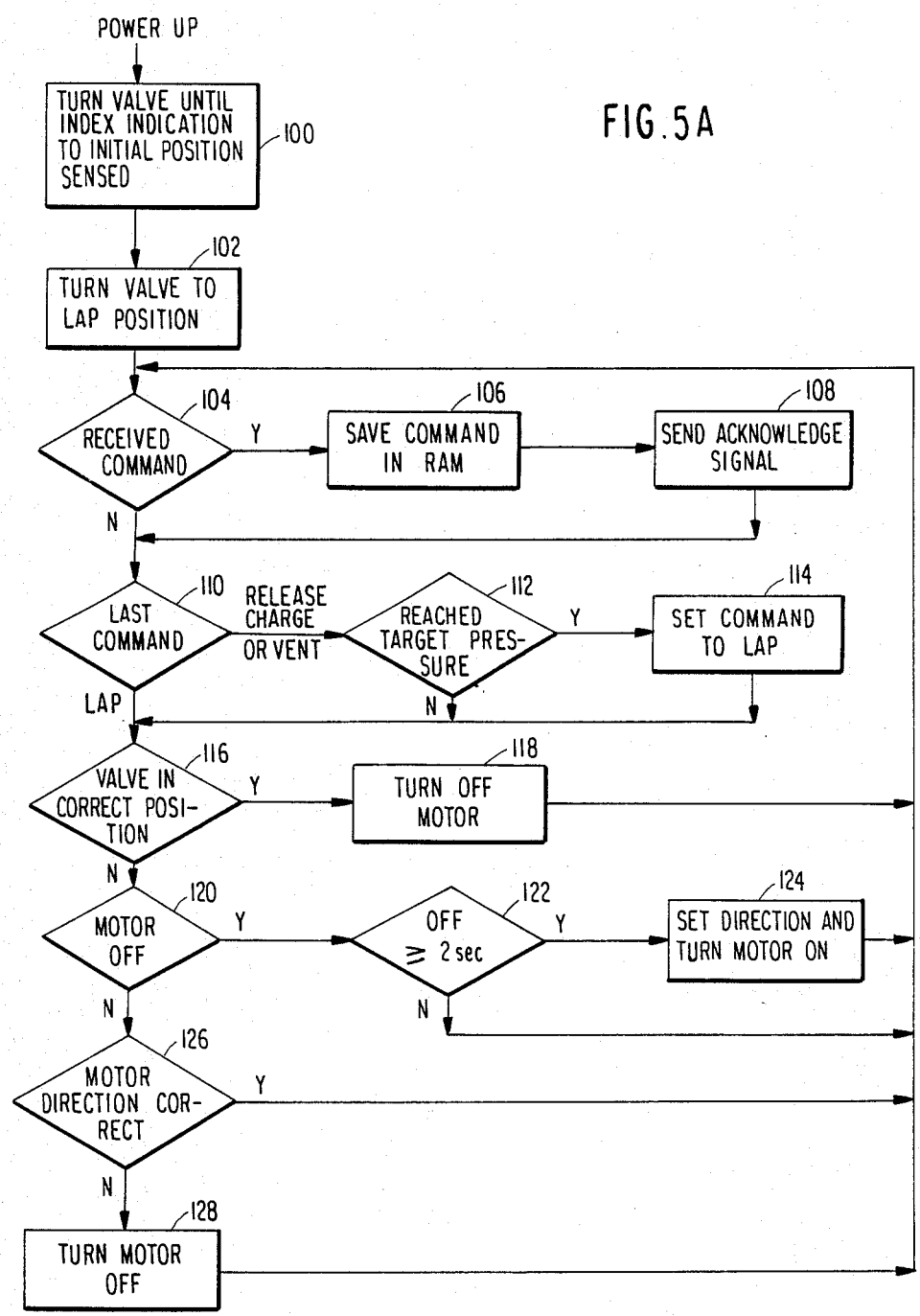
FIGS. 5A and 5B are flow diagrams of the stored program for the Head-Of-Train microprocessor.

FIG. 5A shows the main flow diagram of the stored control program for the microprocessor 81 of the HOT circuit 54. This flow diagram discloses the complete logic of the control program, and a prgrammer of ordinary skill in the art can write source code in the assembly language of the microprocessor 81. It is assumed, of course, that the programmer would be familiar with the assembly language of the microprocessor chosen for implementation of the HOT.

At power up, the valve 58 is turned until an index indication is detected for the initial position of the valve, as indicated by function block 100. Then, in function block 102, the valve is turned to the LAP, or closed, position and awaits a command from the Central Control Console. When a command is received as detected in decision block 104, the command is saved in a queue in the microprocessor RAM in function block 106 and an acknowledge signal is sent to the CCC in function block 108. At this point, or if no command is received, a test is made in decision block 110 to determine if the last command in the queue in RAM has been processed. If not, a command to charge, release or vent the brake pipe is processed and then, in decision block 112, a test is made to determine if the target pressure for the brake pipe has been reached. If so, then in function block 114 the command is set to LAP. At this point, or if the last command in RAM has been processed or the target pressure has not been reached as determined by the tests in decision blocks 110 and 112, respectively, the process makes a test in decision block 116 to determine if the valve 58 is in the correct position. If so, the motor 56 is turned off in function block 118 and the process loops back to function block 104 to again await a command from the CCC. On the other hand, if the motor is not in the correct position, a test is made in decision block 120 to determine if the motor 56 is off. If the motor is off, a test is made in decision block 122 to determine how long the motor has been off. If the motor 56 has been off for two seconds or longer, the direction of the motor is set and the motor is turned on in function block 124, and the process loops back to decision block 104. If the motor has been off for less than two seconds, no action is taken and the process loops back to decision block 104. If, however, the motor 58 is on, a test is made in decision block 126 to determine if the direction of the motor is correct. If it is, the process loops back to decision block 104; otherwise, the motor is turned off in function block 128 before the process loops back to decision block 104.

Figure 5B:
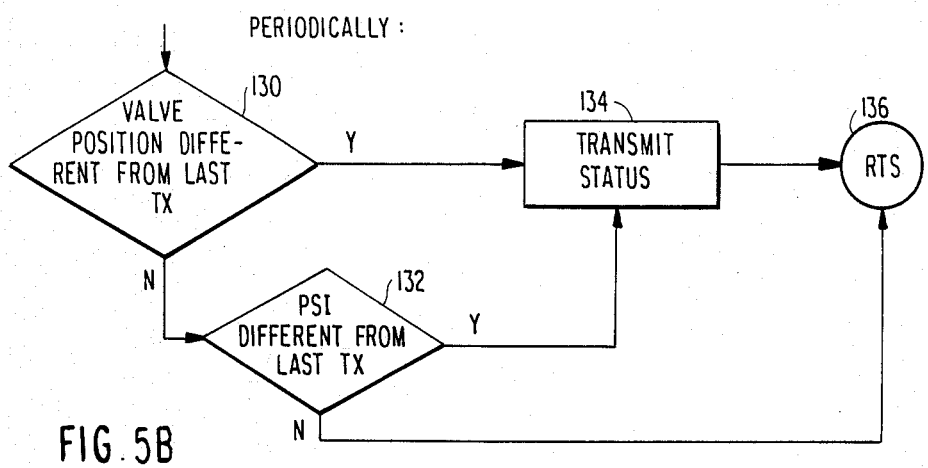

Periodically, the microprocessor 81 performs the process shown in the flow diagram of FIG. 5B. This process will automatically compensate and correct the air pressure if the target pressure has not been achieved due to settling of the air. The maximum number of attmepts is three. First, a test is made in decision block 130 to determine if the valve position is different from the last value transmitted. If not, a test is next made in decision block 132 to determine if the pressure is different from the last value transmitted. If not, the microprocessor 81 transmits a clear message to the CCC. On the other hand, if either of the tests made in decision blocks 130 and 132 are positive, a status message is formatted in function block 134 for transmission at 136 to the CCC unit.

Figure 6:
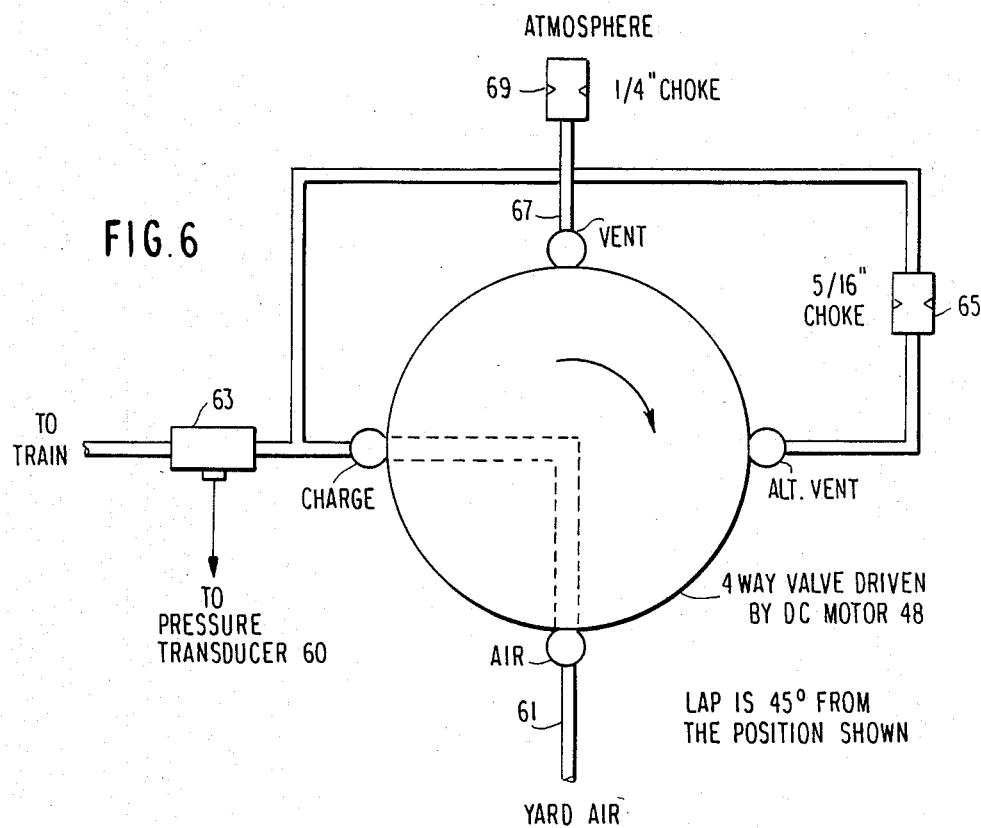
FIG. 6 is a plan view of the d.c. motor driven valve used in the Head-Of-Train device.

FIG. 6 shows a plan view of the four way valve 58 used in the HOT unit. As indicated by the general block diagram of FIG. 2B and in more detail in FIG. 3, the valve 58 is connected to a source of yard air supply. When the valve is in its charge position, as shown in the figure, air is supplied via line 61 through a pneumatic connection 63 to the brake pipe of the lead car of the consist. The connection 63 also provides the connection to the pressure transducer 60. Rotation of the valve clockwise ninety degrees places the valve in the vent position. In this position, air flows from connection 63 through valve 58 to line 67 and choke 69 to atmosphere. A further clockwise rotation of the valve by ninety degrees places the valve in an alternate vent position. In this vent position, which is used to minimize backwards rotation of the valve, air flows from the train connection 63, through choke 65, to valve 58, to line 67, and choke 69 to atmosphere. When the valve is in its release position, the yard air flows from line 61, valve 58, choke 65, and connection 63 to the brake pipe. By the release position, those skilled in the art will understand that what is meant is the release of the brakes, this being accomplished by an increase in the brake pipe pressure. There are four other positions of the valve 58 which are intermediate the four positions just described; e.g., forty-five degree rotation from the charge position shown and so forth. These are the LAP positions which effectively block off the air pipe allowing neither charging, venting nor release of pressure in the brake pipe.

Figure 7:
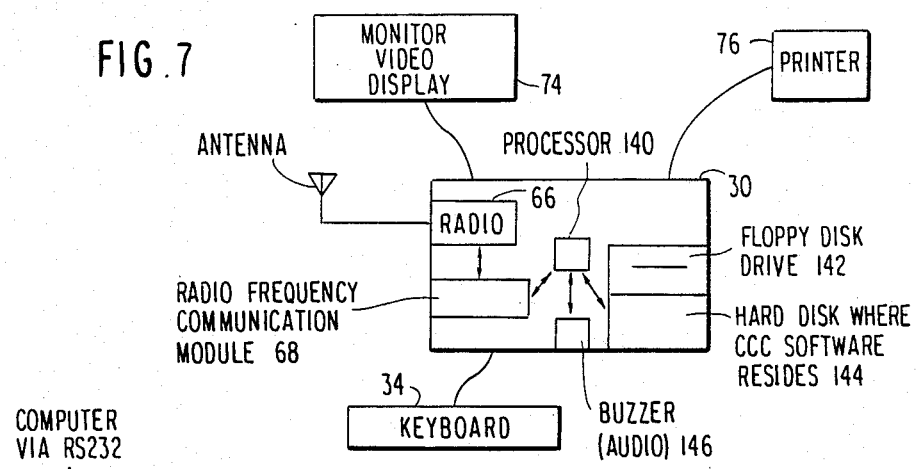
FIG. 7 is a block diagram of the Central Control Counsole.

FIG. 7 shows in block diagram form the CCC unit wherein like reference numerals as used in FIGS. 1 and 2C denote identical components. The housing 30 houses a computer processor 140 which, for an IBM PC or compatible computer, could be one of several Intel microprocessors such as the 8088, 8086, 80286, or the newer 80386. A floppy disk drive 142 and a hard disk drive 144 are provided. The controlling software for the CCC is stored on the hard disk drive 144. In addition, a buzzer 146 for providing an audio output is conventionally provided in these computers.

Figure 8:
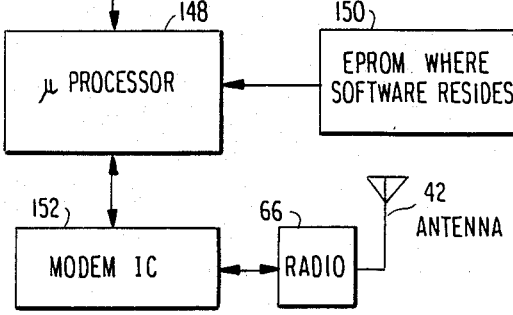
FIG. 8 is a detailed block diagram of the radio frequency communication module of the Central Control Console.

The radio frequency communication module 68 is shown in more detail in FIG. 8 and comprises a microprocessor 148 which communicates with the computer 70 via a standard RS232 serial port. The control program for the microprocessor 148 is stored in an Electronically Programmable Read Only Memory (EPROM) 150. Formatted commands and messages are processed by a commercially available modem IC 152 which provides the interface to the radio transceiver 66.

Figure 9A:
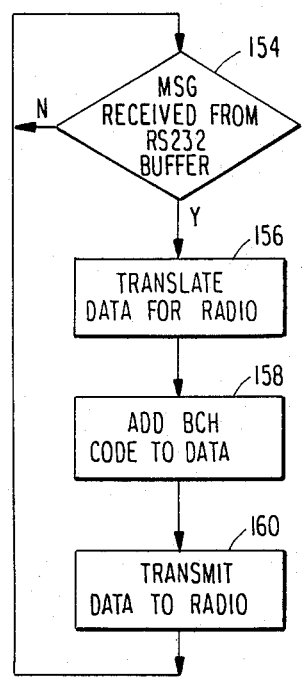
FIGS. 9A and 9B are flow diagrams of the stored program of the radio frequency communication module microprocessor.
Figure 9B:
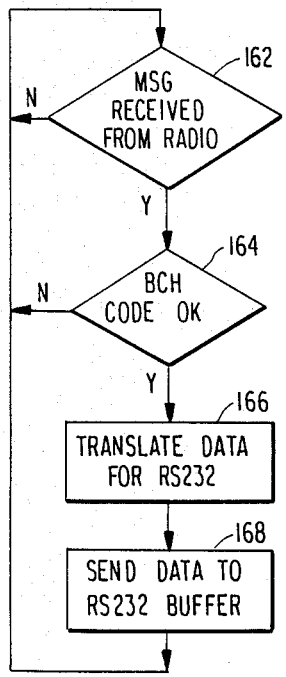

FIGS. 9A and 9B are the flow diagrams of the stored control program which resides in the EPROM 150 of the radio frequency communication module 68. Both of these programs are interrupt drivers and are readily coded by a programmer of ordinary skill in the art in the assembly language of the microprocessor. In FIG. 9A, the routine includes a test indicated by decision block 154 for a message received from the computer 70 via the RS232 buffer. The routine simply loops until a message is detected, at which point the data is translated for transmission by the radio transceiver 66 in function block 156, an error detection and correction BCH code is added to the data in function block 158, and the resulting data is transmitted to the radio transceiver in function block 160 before the interrupt driver resumes its initial state.

In FIG. 9B, a test is made in decision block 162 for a message received from the radio transceiver 66. The routine loops until a message is detected, at which point a test is made in decision block 164 to determine if the BCH code is correct. If the code is not correct, the message is ignored, and the process returns to decision block 162. On the other hand, if the BCH code is correct, the received data is translated for the RS232 port of the computer 70 in function block 166, and then the data is sent to the RS232 buffer in function block 168 before the interrupt driver returns to its initial state.

Turning now to FIGS. 10A to 10G, the flow diagrams for the program of computer 70 are shown. The following list of keys of the keyboard 72 and their functional description should be considered together with the description of the program. For an IBM PC type keyboard there are ten function keys denoted F1 to F10. Other keyboards have more function keys. While not described below, the preferred embodiment uses an eleventh function key which, for an IBM PC PC type keyboard, is implemented by using the ALT (Alternate) key on that keyboard.

F1—Add Key: This key adds a row on the screen to enable the operator to add another train, unless the maximum of 45 trains is already displayed.

F1—Test Key: This key lets the operator to start a test on the current train, if the train already under test gives the operator the option to abort the test.

F3—Charge Key: This key enables the operator to charge a train to yard air or to any desired pressure up to 100 psi.

F4—Release Key: This key enables the user to release pressure to the train.

F5—Vent Key: This key enables the operator to vent pressure from the train either to 0 psi (atmosphere) or any desired pressure.

F6—Interrogate Key: This key lets the operator send out an interrogation message to the HOT of the train currently under test.

F7—LAP Key: This key enables the operator to set the value of a train in LAP position (no air movements).

F8—Screen Kay: This key allows the operator to switch between three screens that simulate a wide RS96 form. The operator can change screens by pressing this key to successively display each of the three screens in rotating order.

F9—Delete Key: This key enables the operator to delete the whole train (one row of the screen) or one of the following: HOT#, EOT# or Train Symbol.

NOTE: Function keys F2 through F7 and F9 apply to the train that is the current train; i.e., the train the cursor is on in the display.

F10—Miscellaneous Key: This key brings up a menu on the screen that enables the operator to generate an RS96 form, change a password, display the help information, or save the screen and restart the program. This key is disabled when a train is under test.

In addition to the function keys, the keyboard has several other keys which are described below:

Right Arrow Key: This key will highlight the field to be edited which is to the right of the current field. It will switch the screens if necessary. If the operator has requested a function with options, this key will enable the operator to select one of the options.

Left Arrow Key: This key has the same functions as the Right Arrow Key except for direction.

Up Arrow Key: This key enables the operator to change the current train to one row up unless the current train is already at the top. This key is also used when selecting a pressure for F3 and F5 function keys.

Down Arrow Key: This key has the same functions as the Up Arrow Key except for direction.

Home Key: This key sets the current filed to be the first train's train symbol field. It changes screens if required.

End Key: This key sets the current field to be the last train's train symbol field. It changes screens if required.

Pg (page) Up Key: This key, when pressed, will cause the cursor (current field) to move vertically upwards fifteen trains; i.e., if the cursor is on any of the first to fifteenth train, it moves to the first train and if on, for example, the twenty-seventh train, it moves to the twelth train.

Pg Dn Key: This key has the same function as the Pg Up Key except for direction.

Esc (escape) Key: This key enables the operator to set the pass word screen. In case the operator is called away from the computer, no one else can run the program without knowing the pass word.

Alt Key (F11): This key is enabled only for trains under test and only at certain stages of the test. This key enables the operator to enter the results of the inspections (walking the trains) done manually.

Num (number) Lock and Caps Lock Keys: These keys are interrupts and will not cause any effect when they are pressed. The program sets the keyboard to capital letters and disables the selctions of numbers from the cursor key pad.

The following flow diagrams, with their accompanying description, and the description of the key functions given above are sufficient for a programmer of ordinary skill in the art to write source code in a high level programming language such as BASIC, C or Pascal that will implement the invention. Referring first to the main program shown in FIG. 10A, the program begins by displaying an opening screen in function block 170 and then asking the operator for his or her password in function block 172. Upon entry of a password, a test is made in decision block 174 to determine if a correct password has been entered. If not, the process loops back to function block 172 to again prompt the user for his or her password. Assuming, however, that the user has entered a correct password, a test is made in decision block 176 to determine if the password is a master password. The master password allows access to certain utilities which are not available to all users of the system. If the master password is detected, the utility menu is displayed in function block 178. Among the utilities which may be accessed from this menu are changing the system time and/or date, changing the master password, and changing an individual user password.

Assuming either that the user password is not detected or that the utilities menu has been exited, the process next goes to decision block 180 where the operator is prompted to indicate whether he or she wants to recover trains from data stored in the hard disk. If the operator responds in the affirmative, as by pressing the Y key on keyboard 72, data from hard disk 144 is recovered in function block 182 and interrogations are sent to all recovered trains in function block 184. At this point, or if the user responds to the prompt in decision block 180 by pressing the N key, the main screen is displayed in function block 186 and the system is ready for input from the operator.

The main loop of this portion of the program is entered by testing in decision block 188 the internal clock of the computer to determine if midnight has occured. If so, all time variables are updated in function block 190. Next, a test is made to determine if a message has been received from the radio frequency communication module 68 on the RS232 port in decision block 192. If so, that message is processed at 194, as described in more detail with reference to FIG. 10B. Next, a test is made in decision block 196 to determine if the operator has pressed a key on the keyboard 72. Assuming that a key has been pressed, a test is made in decision block 198 to determine if the current train is under test. If the train that the cursor is on is not under test, a test is next made in decision block 200 to determine if a password is needed. If not, a test is made, in decision block 202, to determine if trains are present. If so, the current field is edited at 204, as described in more detail with reference to FIG. 10F. Once the current field has been edited or if the test in decision block 202 is negative, the process goes to node 205 of the flow diagram.

Returning to decision block 200, assume now that a pass word is needed. In this case, a check is made of the keyboard input for the return key in decision block 206. As long as the keyboard input does not produce a return key code, the pass word is accumulated in function block 208. When the return key code is detected, the pass word is checked in process 210, as described in more detail with reference to FIG. 10C, and the process goes to node 205. The process also arrives at node 205 if the test in decision block 198 is affirmative; that is, the current train is under test. The user can not edit the train under test, so in this case, the key input from keyboard 72 is ignored and the operator is warned as by activating buzzer 146.

Beginning at node 205, a test is made in decision block 214 to determine if there are any trains present. If there are, routine realtime checks process 216, described in more detail with reference to FIG. 10G, is performed and when those checks are complete, a test is made in decision block 218 to determine if there are any trains under test. If there are trains under test, the status of all trains under test is checked and updated, if necessary, in function block 220. Once the checks are complete, or if there are no trains or none under test, a check is made in decision block 222 to determine if three minutes have passed since the last key input was detected. If so, the pass word is requested in function block 224; otherwise, the process loops back to decision block 188.

Figure 10A:
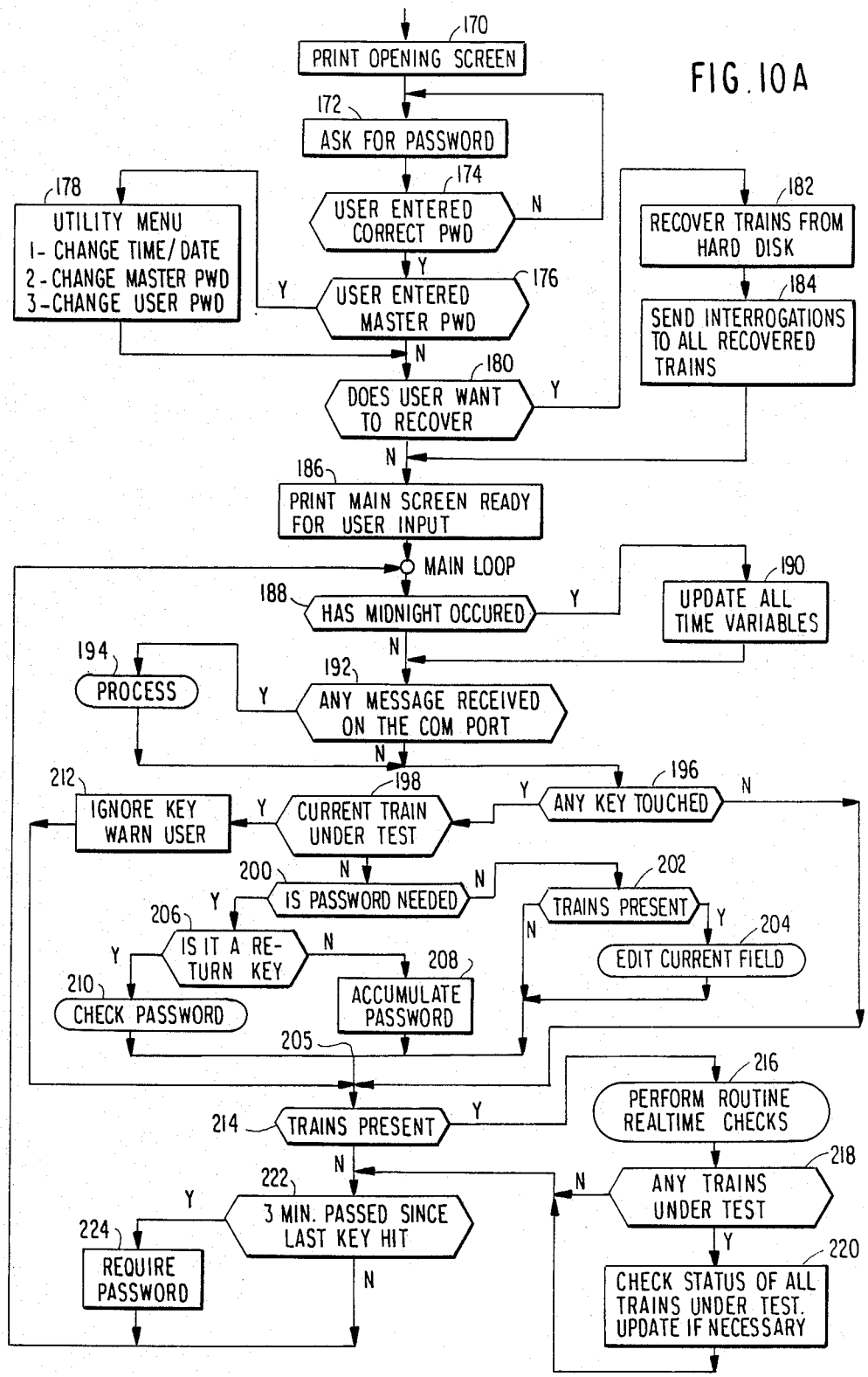
FIGS. 10A to 10G are flow diagrams of the Central Control Console software.
Figure 10B:
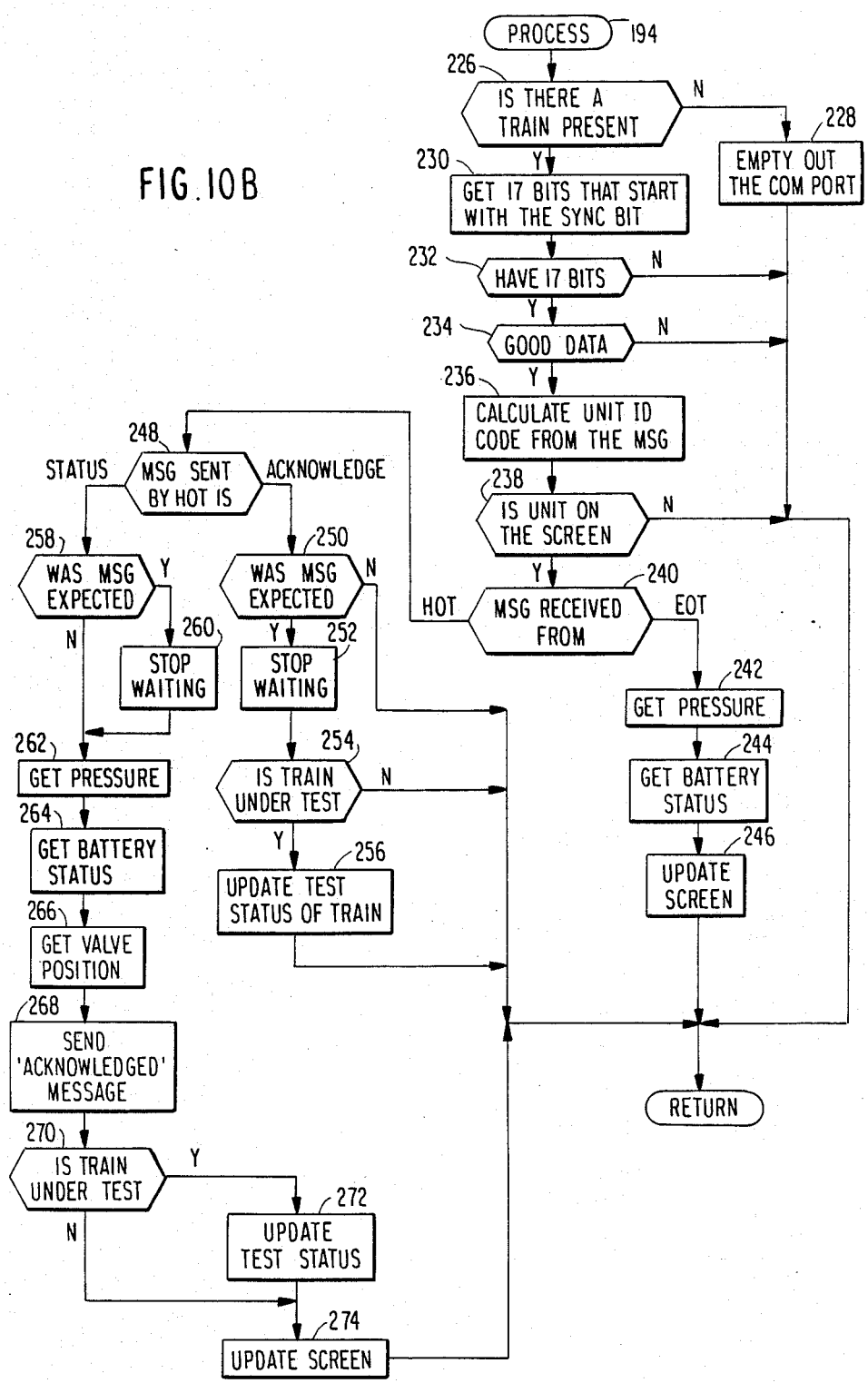

The flow diagram for the process 194 of FIG. 10A is shown in FIG. 10B. First, a test is made in decision block 226 to determine if a train is present. If not, the RS232 serial port buffer is cleared in function block 228, and the process returns to the main program. However, if a train is found to be present, seventeen bits starting with a sync bit are accessed in function block 230. Seventeen bits is the number of bits used in a message according to the protocol of a preferred embodiment of the invention, but those skilled in the art will recognize that the number of bits is a matter of design choice. If there are not seventeen bits as determined by decision block 232, there is an error and the process returns to the main program. If seventeen bits have been retrieved, a test is made in decision block 234 to determine if the seventeen bits represent good data. If not, an error is detected and the process returns to the main program. If good data is detected, then the unit ID code is calculated from the message in function block 236. A test is then made in decision block 238 to determine if the unit that sent the message is displayed on the screen. If not, then the process returns to the main program. If the unit is displayed on the screen, a determination is made in decision block 240 as to whether the message was received from the EOT or the HOT. Assume first that the message was received from the EOT. The pressure is extracted from the message in function block 242, and then the battery status is extracted from the message in function block 244. This information is then used to update the screen in function block 246 before the process returns to the main program.

If the message was received from the HOT, a determination is made in decision block 248 as to whether the message is an acknowledge message or a status message. If an acknowledge message, a test is made in decision block 250 to determine if the message was expected; that is, whether the CCC had recently sent a command to the HOT which required an acknowledgement. If not, there is an error and the process returns to the main program. Otherwise, the flag for the acknowledge message is reset in function block 252. Then, a test is made in decision block 254 to determine if a train is under test. If not, the process returns to the main program. Otherwise, the status of the train under test is updated in function block 256 before the process returns to the main program.

The HOT sends an acknowledge message indicating it received the message sent by the computer, and it sends a status message when it completes the function (setting valve positions) requested by the computer. If a status message is received from the HOT, a test is made in decision block 258 to determine if the message was expected. Status messages may be transmitted from an HOT periodically when pressure changes or upon the occurence of some event; i.e., when it completes the requested function by the computer. It also sends a status message if the user sent an interrogation. The former would be expected, while the latter would not. If the message is an expected message, the flag indicating that a message is expected is reset in function block 260. In either case, the pressure is extracted from the message in function block 262, the battery status is extracted in function block 264, and the valve position is extracted in function block 266. Then, an acknowledge signal is transmitted to the HOT in function block 268. A test is made in decision block 270 to determine if the HOT that sent the message is under test. This is detected by the unit ID code of the HOT number or the EOT number. If so, the test status of the train is updated in function block 272. In either case, the screen is updated in function block 274, and the process returns to the main program.

Figure 10C:
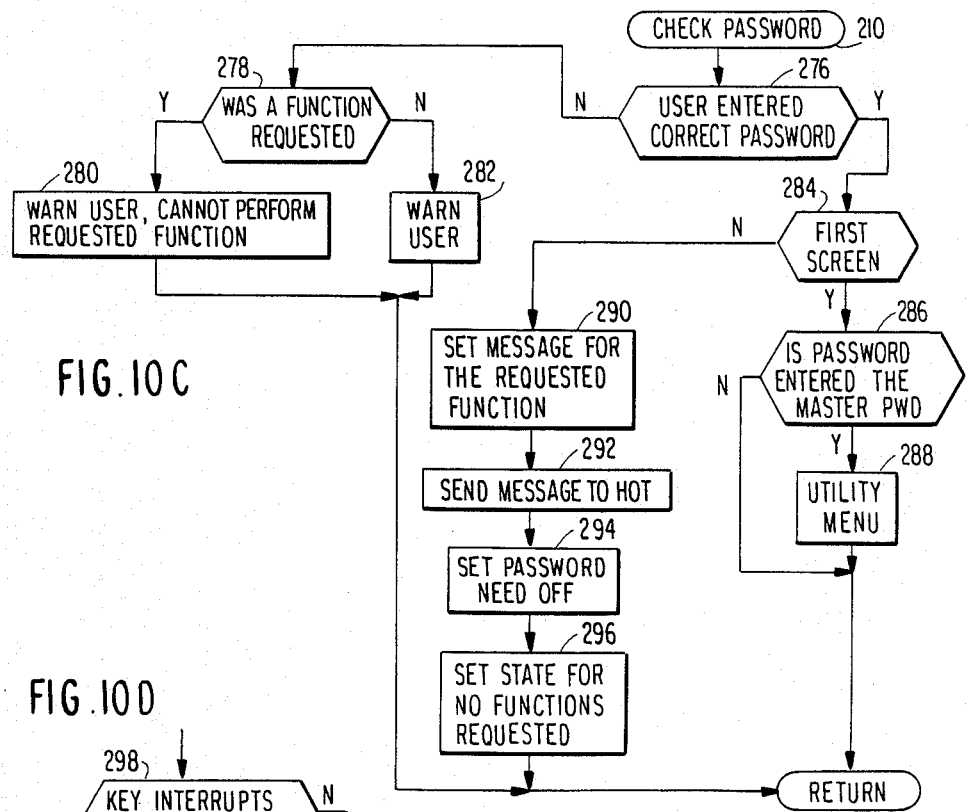

FIG. 10C shows the flow diagram for the process of check password 210 of the main program of FIG. 10A. The password entered by the operator is checked in decision block 276 to determine if it is a correct password. If it is not, a test is made to determine if the operator requested the system to perform a function. If so, the operator is warned that the requested function can not be performed; otherwise, the user is simply warned that the password entered is not good. The process then returns to the main program. If the password entered is a correct one, and if the first screen is displayed as determined by decision block 284, then the password is checked to determine if it is the master password in decision block 286. If it is the master password, the utility menu is displayed in function block 288. The process then returns to the main program.

If the password entered is a correct password and the first screen is not being displayed, the message for the requested function is set in function block 290, and the message is transmitted to the HOT in function block 292. The flag requiring a password is then reset in function block 294. The state for no functions requested is set in function block 296 is then set before the process returns to the main program.

Figure 10D:
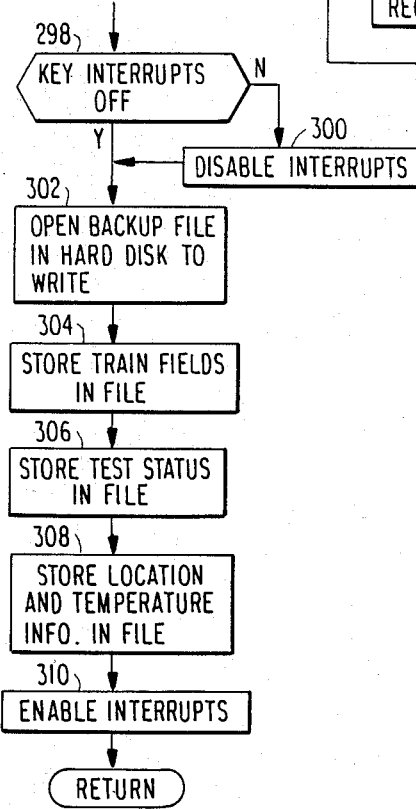

Periodically, about every sixty seconds, the backup file is updated. This routine is shown in FIG. 10D and begins by testing in decision block 298 to determine if the key interrupts are off. If not, the interrupts are disabled in function block 300 before proceeding. The backup procedure first opens the backup file to write in the hard disk 144, as indicated by function block 302. The train fields are stored in this file at function block 304. In addition, the test status and the location and temperature information are stored in this file as indicated in function blocks 306 and 308, respectively. At this point, the interrupts are again enabled at function block 310.

Figure 10E:
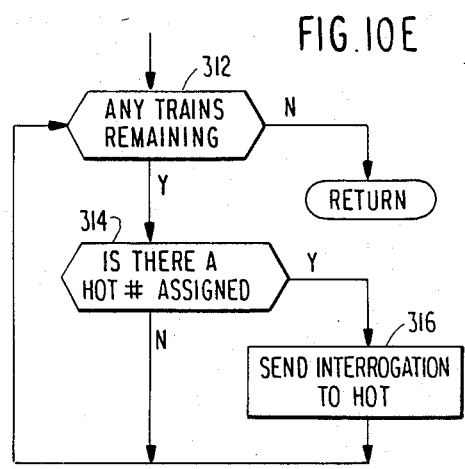

Periodically, about every three minutes, interrogations are sent to trains. This routine is shown in FIG. 10E and begins by testing in decision block 312 to determine if there are any trains remaining. If there are, a test is made in decision block 314 to determine if a HOT number is assigned to the train or trains remaining. If so, an interrogation is sent to the HOT unit in function block 316, and the process loops back to decision block 312 until no further trains remain.

Figure 10F:
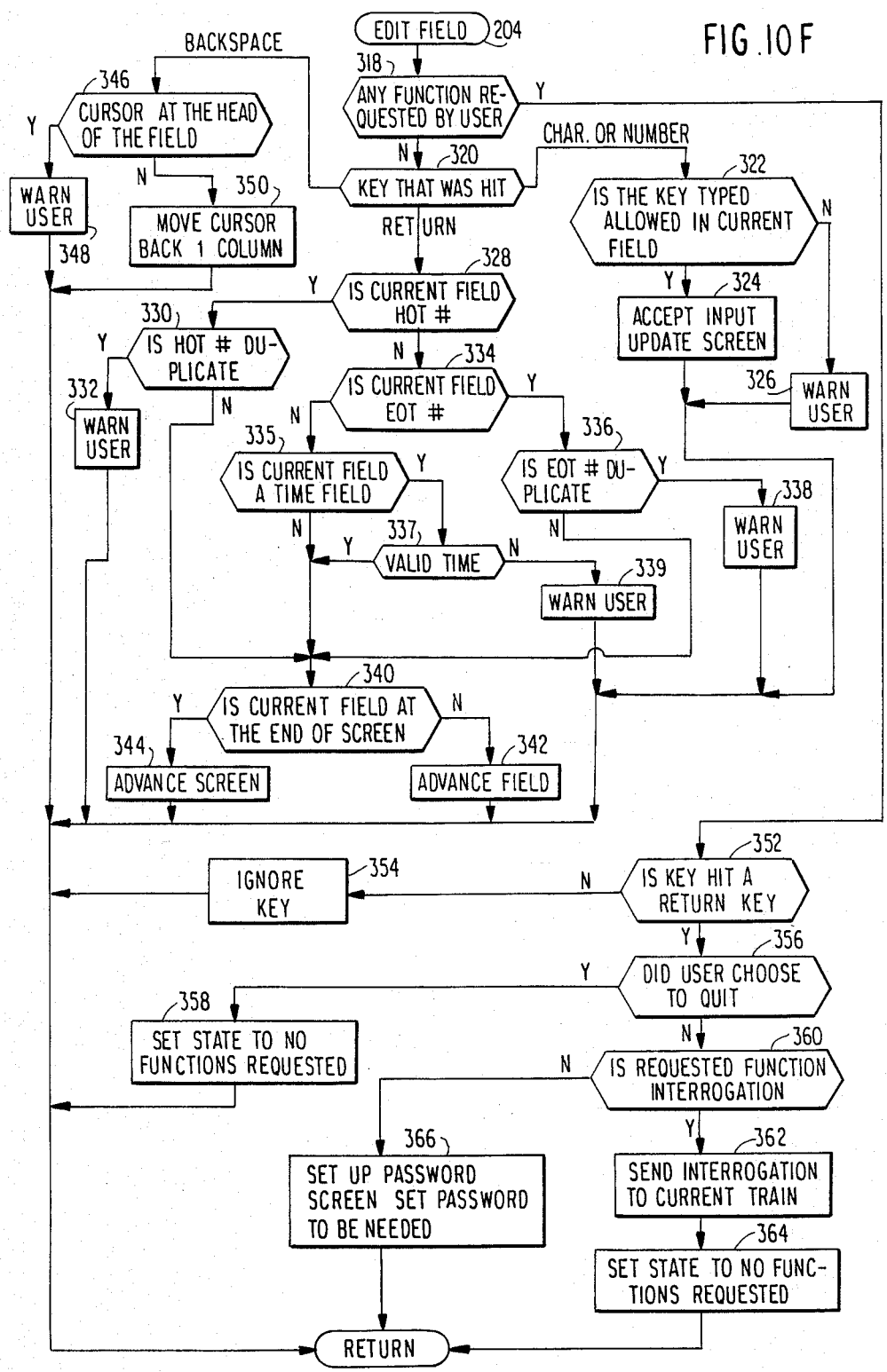
Figure 10G:
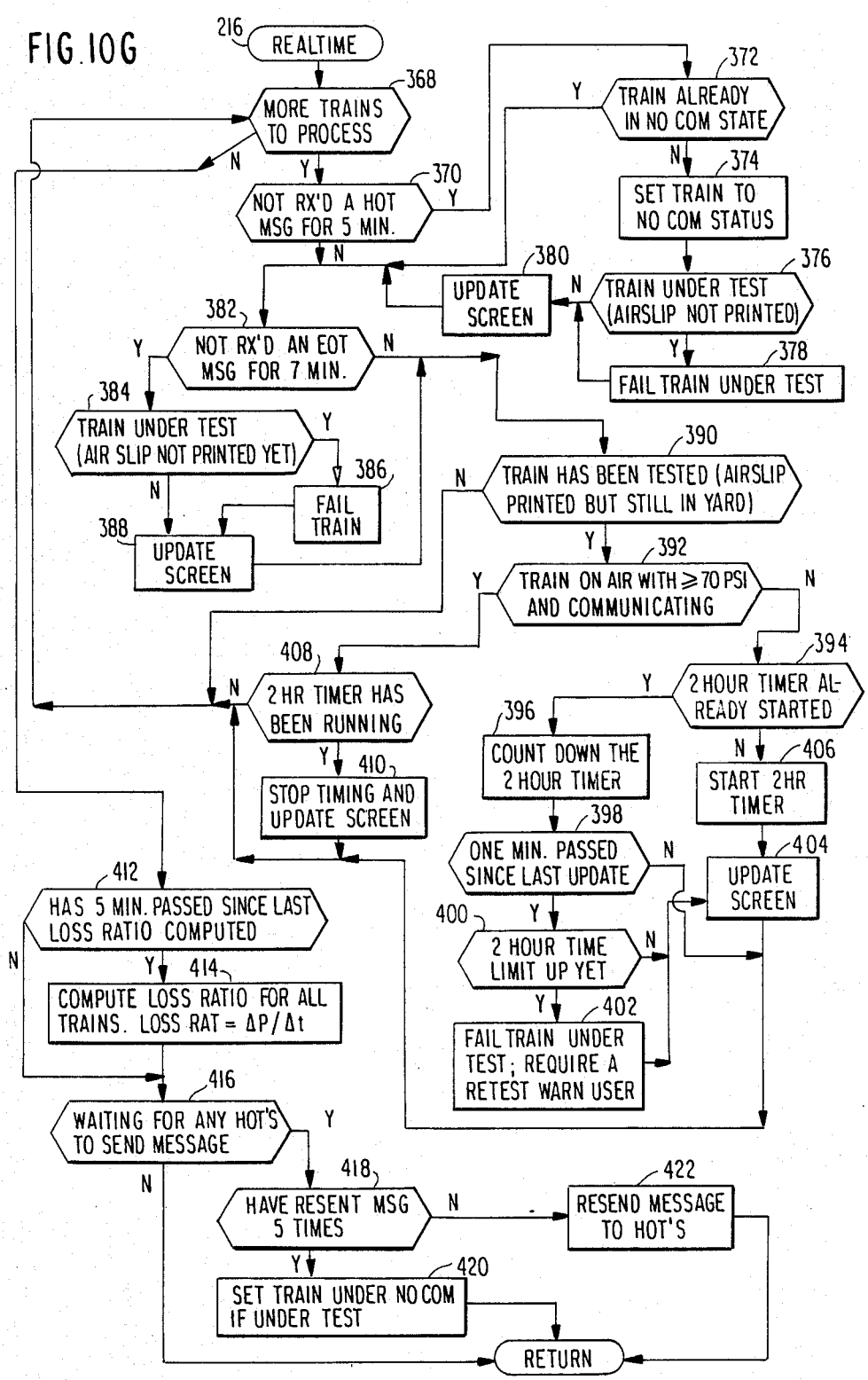

The edit field process 204 of the main program shown in FIG. 10A is shown in FIG. 10F and begins by testing in decision block 318 to determine if any function has been requested by the operator. Assuming first that the operator has not requested a function, decision block 320 distinguishes between character or number keys, the return key and the backspace key. If a character or number key has been pressed by the operator, then, in decision block 322, a determination is made as to whether the key pressed is allowed for the current field. If so, the keyed input is accumulated and the screen updated in function block 324; otherwise, the operator is warned in function block 326 as by sounding the buzzer 146. When the operator has entered the desired number of character and/or number keystrokes, he or she will press the return key. The accumulated keyed input is then tested in decision block 328 to determine if the current field is a HOT number field. If so, a second test is made in decision block 330 to determine if the HOT number is a duplicate number, that is, if it is already assigned to another train, and if it is, the operator is warned in function block 332. If the current field is not a HOT number field, then a test is made in decision block 334 to determine if the field is an EOT number field. If so, a second test is made in decision block 336 to determine if the EOT number is a duplicate number, and if it is, the operator is warned in function block 338. Then, a test is made in decision block 335 to determine if the current field is a time field, and if so, a check is made in decision block 337 to determine if a valid time is entered. If a valid time is not entered, the user is warned in function block 339.

Assuming that the field entered by the operator is either a nonduplicate HOT or EOT number, not a time field, or if a time field that is a valid time has been entered, or neither of HOT or EOT number field, a test is then made in decision block 340 to determine if the current field is at the end of the screen. If it is not, then the field is advanced in function block 342, but if it is, the screen is advanced in function block 344. At this point, the process returns to the main program.

If a backspace is detected in decision block 320, a test is made in decision block 346 to determine if the cursor is at the beginning or first character of the field. If it is, the operator is warned as by sounding the buzzer 146 and the cursor is not moved; otherwise, the cursor is moved back one column before the process returns to the main program.

Returning now to decision block 318, if the operator has requested a function to be performed, then a test is made in decision block 352 to determine if the key pressed is the return key. If not, the keyed input is ignored in function block 354, and the process returns to the main program. However, if the key prssed is the return key, a test is made in decision block 356 to determine if the operator has choosen to quit the program. If that was the operator's choice, the state of no functions requested is set in function block 358 before the process returns to the main program. If that is not the operator's choice, a test is made in decision block 360 to determine if the function requested is an interrogation. If so, an interrogation is transmitted to the current train in function block 362, and then the state of no functions requested is set in function block 364 before the process returns to the main program. the function requested is not an interrogation, then the password screen is displayed and the password needed flag is set in function block 366 before the process returns to the main program.

The real time process 216 of the main program of FIG. 10A is shown in FIG. 10G and is performed for each train. The process begins by testing, in decision block 368, to determine if there are more trains to process. If so, a test is made in decision block 370 to determine if a message has been received from a HOT unit within the last five minutes. This is done for each train's HOT unit. If no message has been received in that time period, a test is made in decision block 372 to determine if the train is already in the NOCOM state. If not, the train is set to the NOCOM state in function block 374, and a test is made in decision block 376 to determine if the train is under test but an airslip has not been printed. If so, the train under test is failed in function block 378. In either case, the screen is updated in function block 380.

Next, a test is made in decision block 382 to determine if an EOT message has not been received within the last seven minutes. If no message has been received in that time period, a test is next made in decision block 384 to determine if a train is under test but no airslip has been printed. If so, the train is failed in function block 386. In either case, the screen is updated in function block 388.

In decision block 390, a test is made to determine if the train has been tested and the airslip printed but the train is still in the yard. If so, a test is made in decision block 392 to determine if the train is on yard air with at least 70 psi pressure and communicating. If not, a test is made in decision block 394 to determine if the two hour timer has been started. If started, the two hour timer is counted down in function block 396. A check is made in decision block 398 to determine if one minute has passed since the last update. If not, the process loops back to function block 368, but if so, a check is made in decision block 400 to determine if the two hour time limit has been reached. When the two hour time limit is reached, the train under test is failed in function block 402 and a retest is required. In either case, the screen is updated in function block 404 before the process loops back to decision block 368.

Assume now that the test in decision block 392 is positive, then a test is made in decision block 408 to determine if the two hour timer has been running. If so, the timer is stopped and the screen updated in function block 410 before the process loops back to decision block 368. If the timer has not been running, then the process loops back to decision block 368 directly.

If the test in decision block 368 is negative, a test is then made in decision block 412 to determine if five minutes has passed since the last pressure loss ratio has been computed. If so, the loss ratios for all trains is computed in function block 414. In either case, a test is next made in decision block 416 to determine if the CCC is waiting for any HOT units to send messages. If so, a further test is made in decision block 418 to determine if the message to the HOT units has been resent five times. If so, the train in question is set to NOCOM status, meaning that the HOT has not acknowledged any of the five messages sent, and failed if under test, in function block 420. If the message has not been sent five times, the message is resent in function block 422 before the process returns to the main program.

Figure 11A:
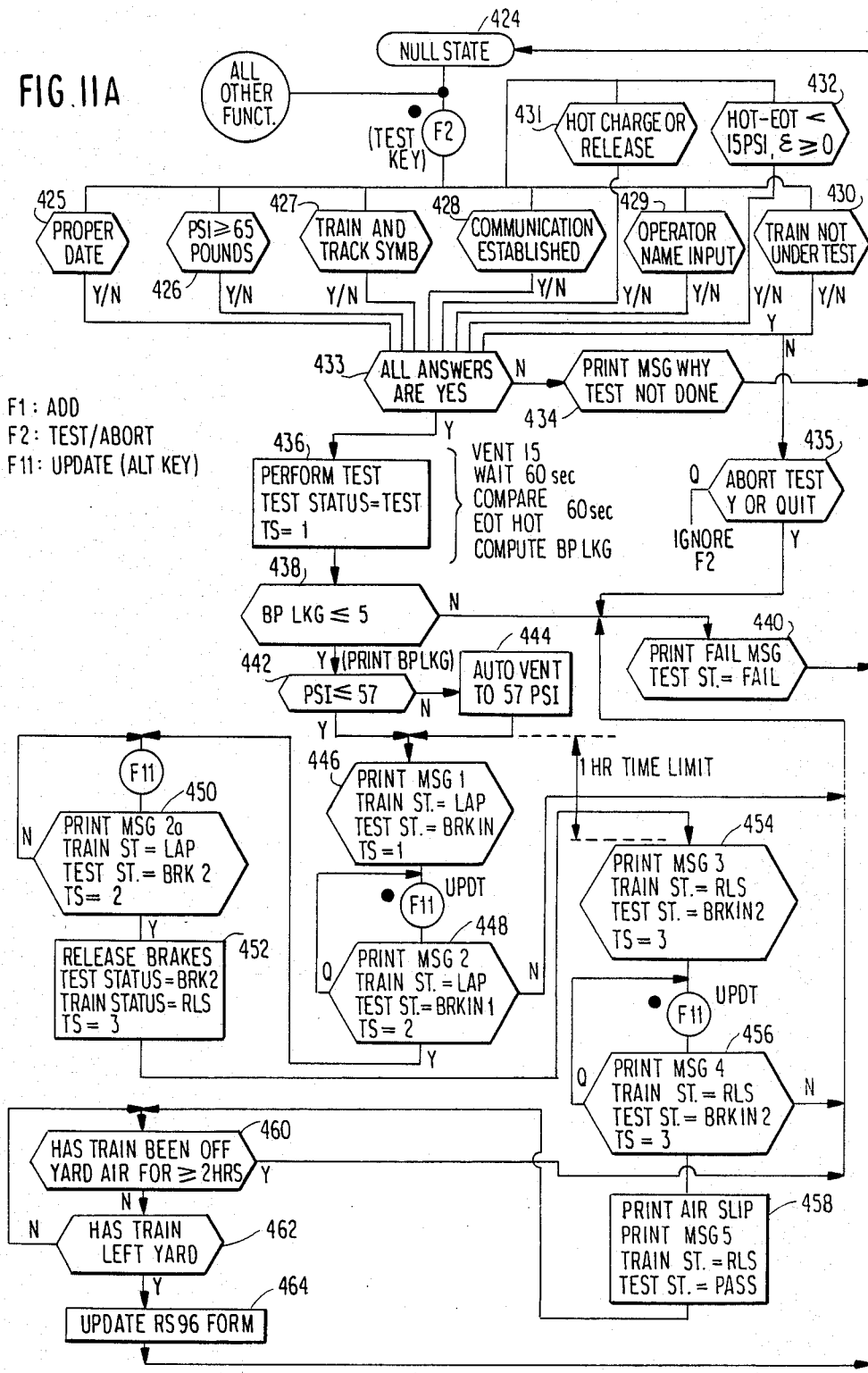
FIG. 11A is a flow diagram of the Initial Terminal Tester test sequence.

The testing flow diagram is shown in FIG. 11A. FIG. 11B shows on the right thereof the screens which are displayed to the operator during the test procedure. On the left of FIG. 11B is a table showing the actions of the various function keys described above for train status 1, 2 and 3, corresponding to the train status (TS) during the three stages during a test.

Testing begins in the null state 424, i.e., TS=0, and is initiated by pressing the F2 function key. All other functions branch from the null state. Note that a password is required when the F2 function key is pressed. When the F2 function key is pressed and the password accepted, a series of checks are made in decision blocks 425 and 432. These include the date, the pressure, train and track symbol, communications established, operator name input, train under test, HOT in charge or relase condition, and pressure differential between HOT and EOT pressures. All checks are tested for positive in decision block 433, and if there are any negative results, a message is printed as to why the test was not done in process block 434. In the case of a negative output from decision block 430 which checks for a train under test, the operator is given the option of aborting the test or quiting in decision block 435. Assuming all tests in decision blocks 425 and 432 are positive, a test is started on the current train as indicated in function block 436 where a fifteen psi reduction and one minute wait takes place. Then the pressure is stored, and after another one minute wait, the pressure is read again, all from the HOT. The difference of the second pressure and the first pressure is the brake pipe leakage. The brake pipe leakage is checked in decision block 438, and if it is greater than five psi, a fail message is printed in process block 440 and the process returns to the null state. If the brake pipe leakage is under the five psi limit, the brake pipe leakage is printed and then a test is made in decision block 442 to determine if the pressure is under 57 psi. If the pressure is greater than 57 psi, the brake pipe is vented to 57 psi in function block 444, and in process block 446, a first message, MSG 1, is printed to the screen when the HOT status goes to LAP after venting to 57 psi. This first message, which is displayed at the bottom of the screen as shown to the right of the flow diagram, identifies the train under test by number and states that the train is ready for test. Then in response to the F11 (Alternate) function key being pressed a second message, MSG 2, is printed at the top of the screen in process block 448. Note again that pressing the F11 function key requires that a password be entered. This second message prompts the operator to respond to the question as to whether the train has passed the brake application test. The operator is given the options of moving the cursor using the arrow keys to Y (yes), N (no), or Q (quit) and pressing ENTER to select one. If Q is selected, the process loops back to await the pressing of the update of F11 key. If N is selected, a fail message is printed at block 440 and the process reverts to the null state. If Y is selected, then in response to the operator pressing the F11 function key for an update, another message is printed in block 450. This message, MSG 2a printed at the top of the screen, prompts the operator to respond to the question as to whether the test is to continue by releasing the brakes. The operator is given the choices of selecting N to wait of Y to release. If N is selected, the process loops back to await the pressing of the F11 key. If Y is selected, the brakes are released in function block 452, then in process block 454, a third message, MSG 3, is printed at the bottom of the screen. The maximum time allowed to pass from process 446 to process 448 is one hour, as indicated in the flow diagram. If the user does not get to the process 448 in one hour from the process 446, the test fails and the train must be retested. The third message reports that the release check for the train is ready to be done. At this point, the operator can again press the F11 function key and the system prints a fourth message, MSG 4, at at the top of the screen in process block 456. This fourth message prompts the operator with the question as to whether all brakes have been properly released. The operator is given the options of selecting Y, N or Q. If Q is selected, the process loops back to await the pressing of the F11 function key again. If N is selected, a fail message is printed in process block 440 and the system reverts to its null state. If Y is selected, the airslip is printed in function block 458, and a fifth message, MSG 5, is printed at the bottom of the screen. This fifth message states that the train has passed the test. Next, in decision block 460, a test is made to determine if the train has been off yard air for more than two hours. If it has, a fail message is printed in process block 440; otherwise, a test is made to determine if the train has left the yard. If not, the time the train remains in the yard is monitored until it leaves. Upon leaving, the RS96 form is updated in function block 464 and can be generated and printed by the user from the menu by pressing the F10 key.

While the invention has been described in terms of a specific preferred embodiment, those skilled in the art will recognize that variations and modifications of this embodiment can be made without departing from the spirit and scope of the appended claims.

Having thus described our invention, what we claim as novel and desire to secure by Letters Patent is as follows:

1. An automated initial terminal test system for checking the air pressure and leakage of brake pipes and the operation of brakes of railroad trains in a terminal yard before the trains are allowed to go on a railroad comprising:
   an end of train device for each train in the yard under test, said end of train device being connected to the brake pipe at the end of the train for monitoring and transmitting air pressure data;
   a head of train device for each train in the yard under test, said head of train device being connected to a source of air and to the brake pipe at the head of the train for charging and venting the brake pipe and for monitoring and transmitting air pressure data; and
   a central control console located in the train yard, said central control console receiving transmissions from each of said end of train and head of train devices and transmitting commands to said head of train devices for controlling said charging and venting operations, said central control console monitoring the pressures of the brake pipes of the trains under test, computing leakages of the brake pipes, and providing an output indicating whether the trains under test passed or failed the tests.

2. The automated initial terminal test system recited in claim 1 wherein said end of train device comprises:
   pressure transducer means connected to said brake pipe and generating a signal proportional to air pressure in said brake pipe at the end of the train;
   microprocessor means connected to said pressure transducer means and responsive to said signal for formatting a message including the identification of the end of train device and the pressure at the end of the train; and
   transmitter means connected to said microprocessor means for transmitting said message to said central control console.

3. The automated initial terminal test system recited in claim 2 further comprising display means connected to said microprocessor means for providing a readout of the pressure at the end of the train.

4. The automated initial terminal test system recited in claim 2 wherein said head of train device comprises:
   transceiver means for receiving transmissions from said central control console and transmitting messages to said central control console;
   second microprocessor means connected to said transceiver means for interpreting transmissions received from said central control console and formatting messages for transmission to said central control console; and
   motor driven valve means connected to and responsive to commands from said microprocessor means for controlling the flow of air to the brake pipe, venting air from the brake pipe to atmosphere or blocking the flow of air to or from the brake pipe.

5. The automated initital terminal test system as recited in claim 4 where in said head of train device further comprises:
   second pressure transducer means connected to the brake pipe at the head of the train for generating a signal proportional to the pressure in the brake pipe; and
   position transducer means connected to said motor driven valve means for generating a signal proportional to a position of said valve means, said second microprocessor means formatting a message including an identification of the head of train device, the pressure at the head of the train and the position of said valve means.

6. The automated initial terminal test system as recited in claim 5 wherein said second microprocessor means is responsive to said signal from said second pressure transducer means as a feedback signal for controlling said motor driven valve means.

7. The automated initial terminal test system as recited in claim 6 wherein said second microprocessor means is responsive to said signal from said position transducer means as a feedback signal for controlling said motor driven valve means.

8. The automated initial terminal test system as recited in claim 7 further comprising display means connected to said second microprocessor means for providing a readout of the pressure at the head end of the train.

9. The automated initial terminal test system as recited in claim 7 wherein said central control console comprises:
   computer means including user input means for receiving inputs from a user and display means for providing a display of fields for entry of data by the user and messages to communicate status of trains under test to the user, said computer means being programmed to automatically perform tests for checking the air pressure and leakage of the brake pipes and operation of the brakes of a plurality of trains in the terminal yard; and
   transceiver means connected to said computer means for receiving transmissions for said end of train and head of train devices attached to said plurality of trains and supplying data to said computer means, said computer means being responsive to user input and data supplied by said transceiver means for formatting messages for transmission to said head of train devices.

10. The automated initial terminal test system recited in claim 9 further including printer means connected to said computer means for printing an air slip when a train passes the tests performed by said computer means, said air slip providing the authority for allowing a train to go on a railroad.

11. The automated initial terminal test system recited in claim 4 wherein said motor driven valve means comprises:
 valve body means having at least three ports designated air, charge, and vent, said air port being connected to said source of air, said charge port being connected to the brake pipe at the head of the train, and said vent port being connected to atmosphere;
 valving means in said valve body means movable to a plurality of positions for selectively connecting two of said ports or blocking a connection between any of said port; and
 motor means connected to said valving means for moving said valving means to any of said plurality of positions in response to said second microprocessor means.

12. A computer process for use in an automated initial terminal test system for checking the air pressure and leakage of brake pipes and the operation of brakes of railroad trains in a termainal yard before trains are allowed to go on a railroad, said system including an end of train device for each train in the yard under test, a head of train device for each train and a central control console receiving transmissions from each of the end of train and head of train devices and transmitting commands to the head of train devices, said central control console comprising a computer for running said process, a display screen for displaying fields to be filled in by a user and messages, said process comprising the steps of:
 monitoring for transmissions of messages from end of train and head of train devices;
 decoding any messagaes received to obtain an identification of the device transmitting the message;
 if the device is an end of train device, decoding a pressure message and updating the screen; and
 if the device is a head of train device, decoding a pressure message and a valve position message and updating the screen.

13. The computer process recited in claim 12 further comprising the steps of:
 monitoring for a user input and if a user requests the system to perform a test on a train,
 checking the pressure of the brake pipe of the train under test to determine if it exceeds a first predetermined value, and if so,
 venting the brake pipe to reduce the pressure by a second predetermined value to cause the brakes to be applied and computing the brake pipe leakage as a function of pressures at the end of the train and the head of the train;
 if the computed leakage is less than a third predetermined value, adjusting the pressure of the brake pipe to a fourth predetermined value and monitoring for a user input indicating that the train has passed a brake applied inspection;
 if the train has passed a brake applied inspection, increasing the pressure in the brake pipe to release the brakes and monitoring for a user input indicating that the train has passed a brake released inspection; and
 if the train has passed a brake released inspection, printing an air slip to provide authority for allowing the train to go on a railroad.

14. The computer process recited in claim 13 further comprising the steps of:
 prompting a user requesting a test to be performed to input a password;
 checking a password input by the user to determine if it is a valid password; and
 if a valid password, performing the test.

15. A head of train device for use in an automated initial terminal test system for checking the air pressure and leakage of brake pipes and operation of brakes of railroad trains in a terminal yard before the trains are allowed to go on a railroad, said head of train device adapted to be connected to a source of air and to the brake pipe at the head of the train for charging and venting the brake pipe comprising:
 transceiver means for receiving transmissions from a central control console and transmitting messages to said central control console;
 microprocessor means connected to said transceiver means for interpreting transmissions received from said central control console and formatting messages for transmission to said central control console; and
 motor driven valve means connected to and responsive to commands from said microprocessor means for controlling the flow of air to the brake pipe, venting air from the brake pipe to atmosphere or blocking the flow of air to or from the brake pipe.

16. The head of train device recited in claim 15 further comprising:
 pressure transducer means adapted to be connected to the brake pipe at the head end of a train for generating a signal proportional to the pressure in the brake pipe; and
 position transducer means connected to said motor driven valve means for generating a signal proportional to a position of said valve means, said microprocessor means formatting a message including an identification of the head of train device, the pressure at the head of the train and the position of said valve means.

17. The head of train device as recited in claim 16 wherein said microprocessor means is responsive to said signal from said pressure transducer means as a feedback signal for controlling said motor driven valve means.

18. The head of train device as recited in claim 17 wherein said microprocessor means is responsive to said signal from said position transducer means for controlling said motor driven valve means.

19. The head of train device as recited in claim 15 wherein said motor driven valve means comprises:
 valve body means having at least three ports designated air, charge, and vent, said air port adapted to being connected to said source of air, said charge port adapted to being connected to the brake pipe at the head of the train, and said vent port being connected to atmosphere;
 valving means in said valve body means movable to a plurality of positions for selectively connecting two of said ports or blocking a connection between any of said ports; and
 motor means connected to said valving means for moving said valving means to any of said plurality of positions response to said microprocessor means.

* * * * *